UNITED STATES PATENT OFFICE.

HEINRICH BRANDENBURG, OF KEMPEN-ON-THE-RHINE, GERMANY.

PROCESS FOR REMOVING TIN FROM TIN-PLATE WASTE.

974,463.  Specification of Letters Patent.  Patented Nov. 1, 1910.

No Drawing. Original application filed March 3, 1908, Serial No. 418,933. Divided and this application filed August 11, 1908. Serial No. 448,062.

*To all whom it may concern:*

Be it known that I, HEINRICH BRANDENBURG, a subject of the King of Prussia, residing and having a post-office address at 29 Moorenring, Kempen-on-the-Rhine, Germany, have invented a new and useful Improvement in Processes for Removing Tin from Tin-Plate Waste and other Tin-Containing Material; and I do hereby declare the following to be a full, clear, and exact description of the same.

The present application is a division of an application Ser. No. 418933, filed 3rd March 1908, for Letters Patent of the United States.

It is well known that tin-plate-waste can be deprived of tin by exposing it to the action of hot caustic alkaline lye, such for instance as solutions of caustic soda and air. In that process the tin is oxidized into oxid of tin, or stannic acid which passes into solution in the shape of stannates of alkalies for instance, stannate of soda. This well-known process is, however, combined with difficulties which are removed by the process according to this invention.

As it is known, the alkaline lye combines in such process on one hand with the carbonic acid of the air forming thus carbonate of soda, and on the other hand with the oxidized tin forming stannate of soda, and consequently loses shortly afterward its capacity of dissolving tin. Besides the thus formed stannate of soda separates from the solution and settles on the tin-plate-waste to be treated and prevents the tin from dissolving, hindering the contact between the alkaline lye and the tinned surface of the plate-waste. This inconvenience is dispensed with according to the present invention by continuously, or at certain intervals renewing the alkaline lye by supplying fresh caustic alkaline lye and by discharging corresponding quantities of the lye already containing stannates. This may be done for instance by means of a pump, which removes from the vessel in which the process is performed continuously the alkaline solution containing already certain quantities of stannates and carbonates, and supplies in their place corresponding quantities of fresh alkaline lye. In first instance this process is intended to be used in connection with the apparatus described in my U. S. patent application Ser. No. 418933 filed 3rd March 1908.

I claim:

The process of removing tin from tin plate, scrap or other tin containing material, together with the simultaneous production of oxid of tin, which consists in flowing a solution of caustic alkali over the tin containing material, air being present in said solution in such quantity as to insure the formation of an oxygen compound of tin, the caustic alkali thereafter converting said compound into stannic alkali with the additional formation of an alkaline carbonate in the fluid mass, removing in part that portion of said alkaline solution encumbered with alkaline carbonate and stannic alkali leaving the principal part of the solution still active, to facilitate the continued formation of said oxygen compound of tin, and continuously supplying fresh quantities of the aerated alkaline reagent to effect a continuous and substantially uniform production of said stannic alkali, substantially as described.

In testimony whereof I have signed my name to this specification in the presence of two subscribing witnesses.

HEINRICH BRANDENBURG. [L. S.]

Witnesses:
OTTO KÖNIG,
WM. WASHINGTON BRUNSWICK.